United States Patent [19]

Schilling et al.

[11] Patent Number: 4,615,627
[45] Date of Patent: Oct. 7, 1986

[54] ROLLER BEARING ASSEMBLY

[75] Inventors: Leonhard G. Schilling, Canton; John K. Winters, Northville, both of Mich.

[73] Assignee: NTN-Bower, Bingham Farms, Mich.

[21] Appl. No.: 742,362

[22] Filed: Jun. 7, 1985

Related U.S. Application Data

[63] Continuation of Ser. No. 678,513, Dec. 5, 1984, abandoned.

[51] Int. Cl.$^4$ .............................................. F16C 19/28
[52] U.S. Cl. .................................................. 384/551
[58] Field of Search .............. 384/551, 560, 571, 565, 384/556, 558, 559, 569

[56] References Cited

U.S. PATENT DOCUMENTS

| | | |
|---|---|---|
| 1,200,510 | 10/1916 | Lockwood . |
| 1,224,346 | 5/1917 | Wingquist . |
| 1,885,852 | 11/1932 | Medved . |
| 1,971,782 | 8/1934 | Herrmann . |
| 1,972,140 | 9/1934 | Frank . |
| 1,976,613 | 10/1934 | Herrmann . |
| 2,383,142 | 8/1945 | Medved . |
| 3,302,987 | 2/1967 | Hoffmann et al. .................. 384/569 |
| 3,304,139 | 2/1967 | Toth et al. ........................... 384/556 |
| 3,361,498 | 1/1968 | Cook ..................................... 384/556 |
| 3,954,313 | 5/1976 | Haenel ................................. 384/569 |
| 4,235,485 | 11/1980 | Reiter . |
| 4,422,698 | 12/1983 | Aoki et al. . |
| 4,427,242 | 1/1984 | Otto . |
| 4,428,630 | 1/1984 | Folger et al. . |

Primary Examiner—Lenard A. Footland
Attorney, Agent, or Firm—Robert F. Hess

[57] ABSTRACT

An improved self-contained roller bearing assembly includes coaxially disposed inner and outer bearing race members (or assemblies), at least one circumferential row of cylindrical rollers and at least one circumferential row of tapered rollers disposed radially between the inner and outer bearing members (or assemblies). The inner and outer bearing race members (or assemblies) include generally recessed and generally non-recessed annular cylindrical raceway surfaces, as well as generally recessed and generally non-recessed annular conical raceway surfaces. At least one of the inner and outer bearing race members or assemblies includes at least a pair of separate race member portions that may optionally be spaced axially from one another by one or more axial spacer members. The separate race member portions and the axial spacer members are fully reversible, with the separate race member portions being interchangeable end-to-end with one another, without affecting the predetermined desired bearing clearance and end play for which the race member portions and the axial spacer or spacers were sized and machined.

13 Claims, 8 Drawing Figures

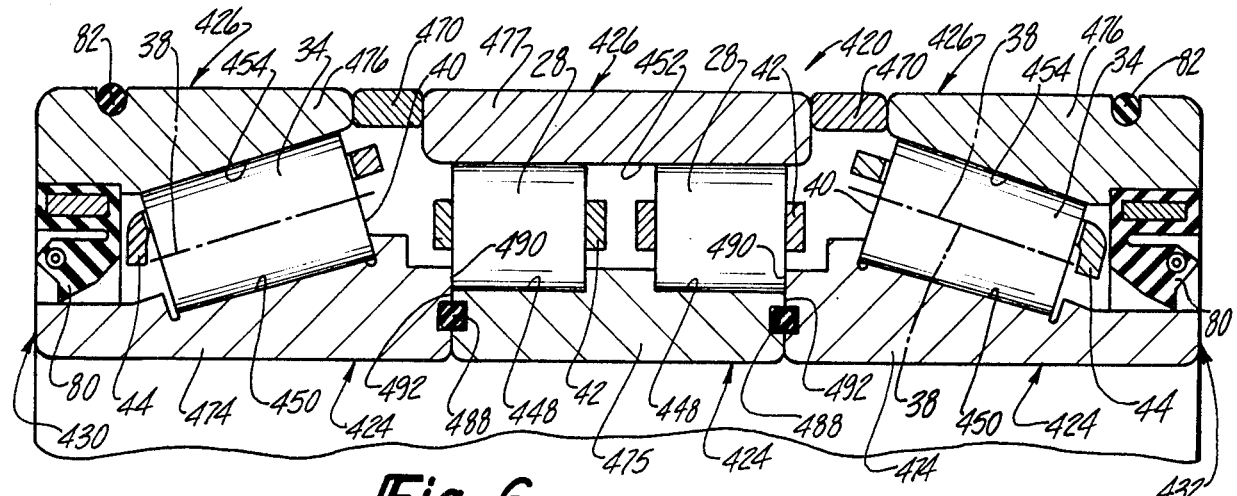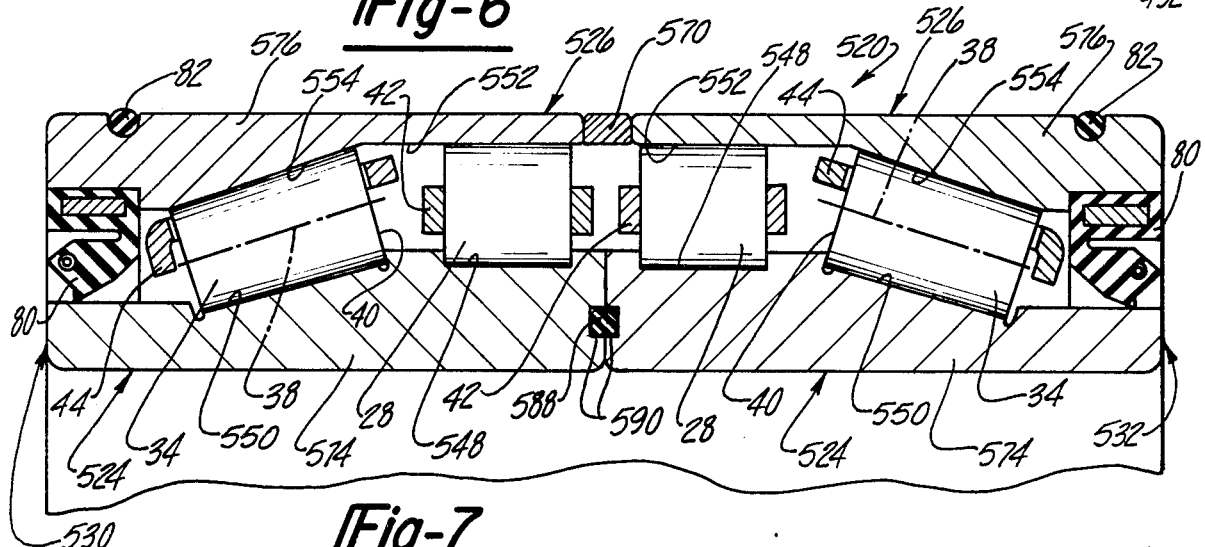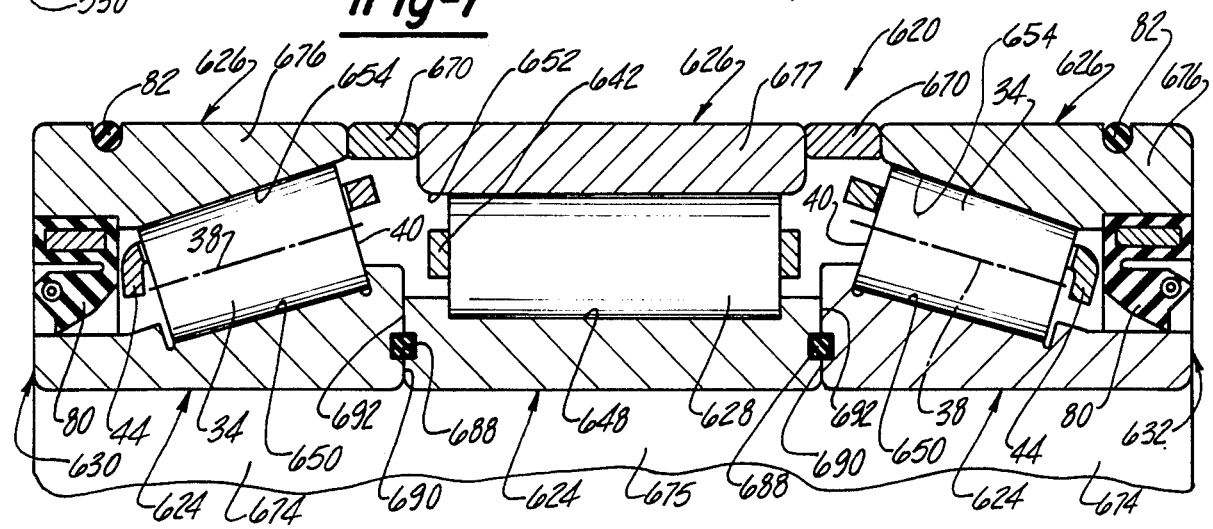

ROLLER BEARING ASSEMBLY

This application is a continuation of application Ser. No. 678,513, filed Dec. 5, 1984, now abandoned.

BACKGROUND AND SUMMARY OF THE INVENTION

The invention relates generally to roller bearings. More particularly, the invention relates to a unitized, multirow bearing assembly containing both tapered and cylindrical rollers.

Various rotatable devices such as rolling mill rolls or other shaft-like members are formed with reduced-diameter end portions, commonly referred to as roll necks, which are received in bearing assemblies that are mounted in fixed frame or housing structures commonly referred to as chocks. Because the various forces and loads on such rolls or other shaft-like devices are frequently quite substantial, the bearings for such rolls must be capable of withstanding high radial and axial loads. Consequently, the bearings for such devices have commonly included multiple rows of tapered anti-friction bearing rollers, with annular conical raceways for axially adjacent rows of such tapered rollers. Additionally, because of the dirty or corrosive conditions of many of the environments in which such bearings are employed, such bearings have frequently been provided in self-contained, unitized, cartridge-type assemblies. Examples of such unitized roller bearing assemblies are disclosed in U.S. Pat. Nos. 4,235,485; 4,336,971; 4,422,698; and 4,427,242, the disclosures of which are incorporated by reference herein.

The previous roller bearing assemblies of the type described above have frequently been constructed with multi-piece radially inner and outer race members (or race member assemblies) that require an inordinately large number of parts or associated components. Furthermore, because of the multiplicity of parts or associated components, such previous roller bearing assemblies have proved to be inordinately complex and expensive to manufacture, assemble, and maintain, as well as frequently being difficult to seal in order to prevent contamination from entering the bearing and lubricant from leaking out into work areas and onto work pieces. Many of such prior roller bearing assemblies have also required automatic lubrication systems used for piping or otherwise conveying lubricant to the bearing assembly. Such lubrication systems add to the expense, complexity, and maintenance burden for the devices or systems in which they are used.

In addition to the disadvantages discussed above, the multi-piece parts or associated components of the radially inner and radially outer race members (or race member assemblies) of the prior bearings were generally required to be very precisely machined and/or mated as matched components in order to provide and maintain the desired bearing clearance for the pairs of adjacent tapered roller bearings. Thus, the multiple pieces or components of the radially inner and radially outer race members were typically not reversible or interchangeable from one axial side end of the bearing assembly to the other, and thus had to be carefully assembled in a specific order and orientation in order to obtain the desired bearing clearance. In addition, in such multi-piece constructions with the pairs of adjacent and oppositely-facing tapered rollers, a number of axial spacer members were frequently required between axially adjacent rows of rollers in order to control the end play of the overall bearing assembly. The multiplicity of such axial spacer members, and the fact that each axial spacer was precisely machined and/or mated as a matched component for its exact axial location, further increased the chance of incorrect or reversed assembly of the various components. Furthermore, such axial spacer members frequently included openings and/or channels for conveying lubricant to the bearing assembly interior and thus were subject to being crushed or otherwise failing under high axial thrust loading conditions.

Accordingly, it is one of the general objects of the present invention to provide a fully-sealed, self-contained roller bearing assembly with a minimum number of parts and/or associated components, thereby simplifying and reducing the expense of the bearing assembly's manufacture, assembly and maintenance. Another object of the invention is to maximize the axial interchangeability and/or axial reversibility of the various parts and components in order to reduce the possibility of improper assembly or improper installation of the bearing assembly. Still another object of the present invention is to provide such a bearing assembly that is packed with lubricant during its assembly and that does not require an auxiliary lubrication system, thereby being more effectively sealed and less costly to install and maintain. In addition to the above, it is an object of the present invention to provide a bearing assembly in which the proper radial and axial bearing clearance is more easily obtained, controlled, and maintained, both during initial assembly and during service after wear has occurred.

In accordance with the present invention, a self-contained roller bearing assembly includes radially inner and radially outer bearing race members (or bearing race member assemblies) coaxially disposed for rotation relative to one another in a radially-spaced apart relationship. At least one circumferential row of cylindrical rollers is rotatably disposed radially between the radially inner and radially outer bearing race members. In one preferred embodiment, a row of such cylindrical rollers is located generally axially adjacent each of the opposite axial outer ends of the bearing assembly. At least one circumferential row of tapered (or conical) rollers is similarly disposed radially between the radially inner and radially outer bearing race members, with a pair of rows of the tapered rollers in one preferred embodiment being located axially between the rows of cylindrical rollers. Alternatively, one or more rows of the cylindrical rollers can be located axially between rows of tapered rollers, with the rows of tapered rollers then being axially located generally axially adjacent each of the opposite axial outer ends of the bearing assembly.

Each of the rows of cylindrical and tapered rollers rotatably engages both a generally non-recessed annular raceway and a generally recessed annular raceway, with the raceways being located at axial locations thereon that correspond to the axial locations of the rows of rollers. The relationship of the non-recessed raceways and the inner and outer race members (or assemblies) allows the cylindrical and tapered rollers to axially adjust themselves in order to obtain and maintain desired predetermined axial and radial bearing clearances.

At least one of the radially inner and radially outer bearing race members comprises a pair of separate race member portions that are axially separable from one another. In some of the embodiments of the invention, the race member portions are spaced axially from one another by one or more axial spacer members. The axially separable race member portions are preferably fully reversible and fully interchangeable end-to-end with one another. The associated axial spacer members, if any, are also preferably fully reversible and interchangeable end-to-end. This is because of the placement of the non-recessed raceway surfaces for the cylindrical and tapered rollers, and because the axially separable race member portions, and their associated axial spacers, if any, are preferably substantially symmetrical. Such interchangeability and reversibility does not affect the predetermined desired radial and axial bearing clearance for which the race member portions and the axial spacers were sized and machined.

In addition to the above features, the preferred roller bearing assembly according to the present invention includes end sealing members that directly engage and radially interconnect the inner and outer bearing race members generally at opposite outer ends of the bearing assembly without the need for separate axial end spacers or other associated end components or end assemblies.

Additional objects, advantages and features of the present invention will become apparent from the following description and the appended claims, taken in conjunction with the accompanying drawings.

BRIEF DESCRIPTION OF THE DRAWINGS

FIG. 6 is a partial longitudinal cross-sectional view similar to FIG. 2, but illustrating still another alternate embodiment of the bearing assembly of the present invention.

FIG. 7 is a partial longitudinal cross-sectional view similar to FIG. 2, but illustrating still another alternate embodiment of the bearing assembly of the present invention.

FIG. 8 is a partial longitudinal cross-sectional view similar to FIG. 2, but illustrating still another alternate embodiment of the bearing assembly of the present invention.

DETAILED DESCRIPTION OF THE PREFERRED EMBODIMENTS

FIGS. 1 through 8 depict various alternate preferred embodiments of the roller bearing assembly according to the present invention, with the bearing assembly installed on a reduced diameter roll-neck portion of a rolling mill for purposes of illustration. One skilled in the art will readily recognize from the following discussion, however, that roller bearing assemblies according to the present invention are equally applicable for other rotatable shaft-like members as well. It should be noted that similar elements and components of the various embodiments are numbered similarly or correspondingly throughout the various figures.

Figure 1:
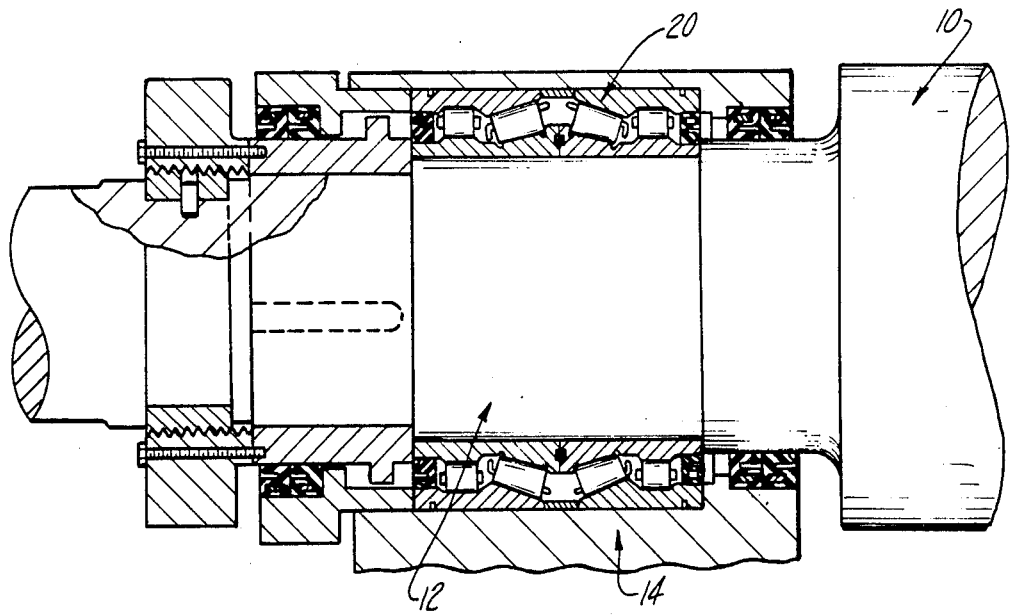
FIG. 1 is a partial view, generally in longitudinal cross-section, of a rolling mill roll or other similar shaft-like rotatable member, with a bearing assembly according to the present invention and an associated fixed frame or chock assembly.

In FIG. 1, a rolling mill roll 10 includes a reduced diameter roll-neck end portion 12 protruding into, and supported by, a fixed frame assembly or chock assembly 14, with a self-contained roller bearing assembly 20 disposed radially therebetween. As will become more apparent from the following discussion, the roller bearing assembly 20, according to the present invention, is preferably a self-contained, fully-sealed, unitized assembly that is slipped over the roll-neck end portion 12 and secured in place in the chock assembly 14 in a manner well-known to those skilled in the art.

Figure 2:
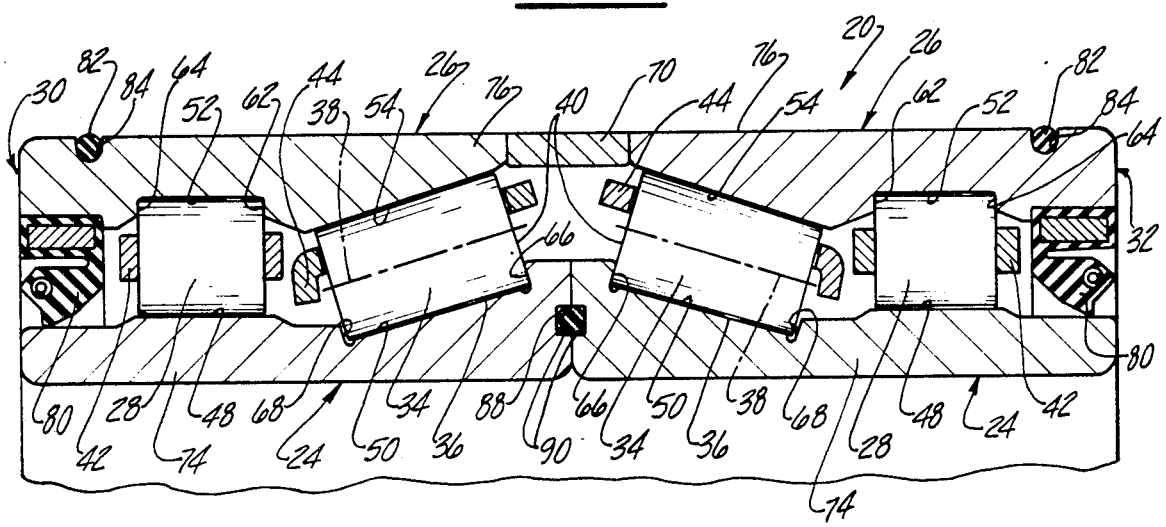
FIG. 2 is an enlarged partial longitudinal cross-sectional view of the bearing assemby of FIG. 1.

One preferred roller bearing assembly 20, illustrated in FIG. 2, generally includes a radially inner bearing race member (or assembly) 24 and a radially outer bearing race member (or assembly) 26 coaxially disposed for rotation relative to one another in a radially spaced apart relationship. A circumferentially-extending row of cylindrical roller elements 28 are disposed radially between the radially inner and outer bearing race members 24 and 26 generally adjacent each of the axial ends 30 and 32 of the bearing assembly 20. Similarly, a pair of circumferentially-extending rows of tapered roller elements 34 are disposed radially between, and in rotatable engagement with, the radially inner and outer bearing race members 24 and 26, respectively. The tapered roller elements 34 are axially located between the rows of cylindrical roller elements 28 and are oriented for rotation about rotational center lines 38 that converge generally in a radially outward direction. Correspondingly, the tapered roller elements 34 include tapered or conical or peripheral surfaces 36 such that their diameters increase axially toward one another and radially outwardly, with their larger diameter ends 40 of axially adjacent tapered roller elements 34 are generally adjacent or at least facing one another. The rows of cylindrical roller elements 28 and the rows of tapered roller elements 34 preferably include retainer cage structures 42 and 44, respectively. Such retainer cage structures 42 and 44 are known to those skilled in the art and serve to maintain the roller elements in each respective circumferential row in a rotatable, but circumferentially spaced apart, relationship relative to one another.

The radially inner bearing race member 24 includes radially inner cylindrical raceways 48 that are rotatably engaged by the cylindrical roller elements 28. The radially inner bearing race member or assembly 24 also includes radially inner conical raceways 50 that are similarly rotatably engaged by the tapered roller elements 34. Similarly, the radially outer bearing race member (or assembly) 26 includes radially outer cylindrical raceways 52 and radially outer conical raceways or raceway surfaces 54, which are rotatably engaged by the cylindrical rollers 28 and the tapered rollers 34, respectively.

In the exemplary preferred bearing assembly 20 illustrated in FIG. 2, the radially outer cylindrical raceways 52 are generally recessed into the radially inner side of the radially outer bearing race member 26 between respective pairs of generally radially-extending outer sidewalls or shoulders 62 and 64, preferably forming a generally channel-shaped or slot-like configuration.

One of the circumferentially-extending rows of cylindrical roller elements 28 is rotatably received and axially restrained in each of the recessed radially outer cylindrical raceways 52, between the respective outer sidewalls or shoulders 62 and 64.

The radially inner conical raceways 50 are each similarly recessed into the radially outer side of the radially inner bearing race member 24, between respective generally radially-extending inner sidewalls or shoulders 66 and 68, preferably forming a generally channel-shaped or slot-like configuration somewhat similar to that of the recessed radially outer cylindrical raceways 52 described above. Thus, similar to the rows of cylindrical roller elements 28, each row of tapered roller elements 34 is rotatably received within one of the recessed radially inner conical raceways 50 between its respective inner sidewalls or shoulders 66 and 68. Also similar to the outer sidewalls 62 and 64 adjacent the recessed radially outer cylindrical raceways 52, the inner sidewalls or shoulders 66 and 68 on opposite axial ends of the recessed radially inner conical raceways 50 serve to generally axially restrain their respective tapered roller elements 34.

The radially inner cylindrical raceways 48 are formed along a circumferential annular path in a non-recessed relationship with the radially outer side of the inner bearing race member 24. Similarly, the radially outer conical raceways 54 are formed along conical annular paths in a non-recessed relationship with the radially inner side of the outer bearing race member 26. Therefore, as will be explained more fully below, the rows of cylindrical roller elements 28 are relatively unrestrained axially relative to the radially inner bearing race member or assembly 24, and the rows of tapered roller elements 34 are relatively unrestrained in a generally axial direction relative to the radially outer bearing race member 26, except for the axial restraining effect of their tapered configuration. To facilitate such a relationship the non-recessed raceway have raceway surfaces that are generally axially longer than the generally axial length of the rollers that rotatably engage them.

In the preferred roller bearing assembly 20 shown in FIG. 2, the radially inner bearing race member 24 includes a pair of radially inner race member portions 74 that are axially separable from one another generally at an axial location between the rows of tapered roller elements 34. Similarly, in the preferred roller bearing assembly 20, the radially outer bearing race member 26 includes a pair of radially outer race member portions 76 that are axially separable from one another at an axial location between the rows of tapered roller elements 34. Preferably, the radially outer race member portions 76 are axially spaced apart from one another by at least one axial spacer member 70. It should be noted that a similar axial spacer member can optionally be included between the radially inner race member portions 74.

The radially inner race member portions 74 and the radially outer race member portions 76 are machined for a predetermined desired radial bearing clearance between the rows of cylindrical roller elements 28 and their respective raceways. Similarly, the axial spacer member 70 is machined for a predetermined axial end play and radial clearance for the tapered roller elements and their respective raceways. Therefore, because of the non-recessed radially inner cylindrical raceways 48 and the non-recessed radially outer conical raceways 54, the radially outer race member portions 76 and the axial spacer member 70 are fully axially reversible with respect to one another, and the radially outer race member portions 76 are fully interchangeable with one another, without effecting the predetermined desired radial bearing clearance or the predetermined axial end play clearance of the bearing assembly 20. Similarly, the radially inner race member portions 74 are also fully axially reversible and interchangeable with one another. Thus, regardless of the axial orientation or axial order of assembly of the radially inner and outer race member portions 74 and 76, respectively, and the axial spacer member 70, the cylindrical roller elements 28 are free to axially adjust themselves relative to their respective non-recessed radially inner cylindrical raceway 48. Similarly the tapered roller elements 34 are free to generally axially and radially adjust themselves relative to their respective non-recessed radially outer conical raceways 54. Thus, the radial bearing clearances and end play bearing clearance are automatically controlled and maintained at predetermined desired levels so long as the axial spacer member is installed axially between the outer race member portions 76. Such an arrangement is possible since only one pair of tapered rollers are included, with the other rollers being cylindrical, and because at least one of the raceways for each of the rollers (tapered and cylindrical) are non-recessed.

Furthermore, to facilitate the above-mentioned reversibility and interchangeability of components, the bearing assembly 20 in FIG. 2 is equipped with axially reversible and interchangeable end sealing members 80 generally at each of the axial ends 30 and 32 of the roller bearing assembly 20. The end sealing members 80 radially interconnect, and directly sealingly engage, both of the radially outer race member portions 76 and the radially inner race member portions 74 at each of the axial ends 30 and 32 of the roller bearing assembly 20. Therefore, the end sealing members 80 sealingly isolate the rows of cylindrical roller elements 28 and tapered roller elements 34 in the radially interior space between the radially inner and outer bearing race members 24 and 26, respectively, without interferring with any axial movement or adjustment of the various components. Furthermore, in order to fully and effectively seal and isolate the bearing assembly 20 as a self-contained unitized assembly, an outer sealing member 82 is disposed within a corresponding groove 84 on the radially outer side of each radially outer race member portions 76. The outer sealing members 82 sealingly engage both their respective outer race member portions 76 and the fixed frame or chock assembly 14 when the bearing assembly 20 is installed therein. The outer sealing member 82 thus substantially prevent the leakage of lubricant from the interior of the bearing assembly and substantially prevent the entry of contaminants into the bearing assembly 20. Generally for the same purpose of preventing leakage of lubricant and entry of contaminants, an inner sealing member 88 is sealingly disposed within corresponding annular grooves 90 in each of the radially inner race member portions 74. The grooves 90 are located substantially at the axial location of the mutual abutting engagement of the radially inner race member portions 74, with the sealing members 88 in a sealing engagement therewith.

Figure 3:
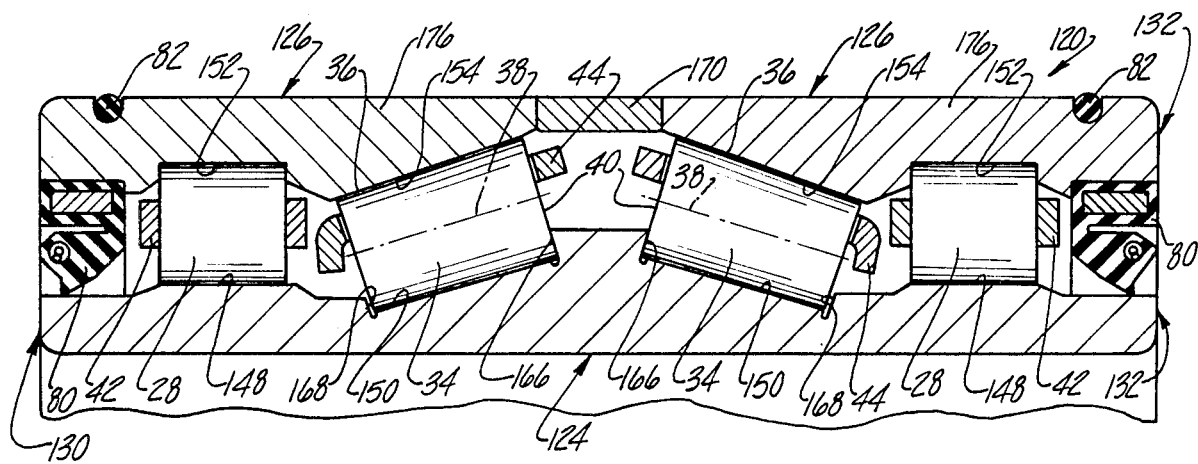
FIG. 3 is a partial longitudinal cross-sectional view similar to FIG. 2, but illustrating an alternate embodiment of the bearing assembly of the present invention.

In FIG. 3, an alternate embodiment of the present invention is illustrated, with the alternate self-contained roller bearing assembly 120 being generally similar in structure and function as the roller bearing assembly 20 shown in FIG. 2, except that the two-piece radially inner bearing race member 24 of FIG. 2, with its separate radially inner race member portions 74, is replaced by a one-piece radially inner bearing race member 124.

Figure 4:
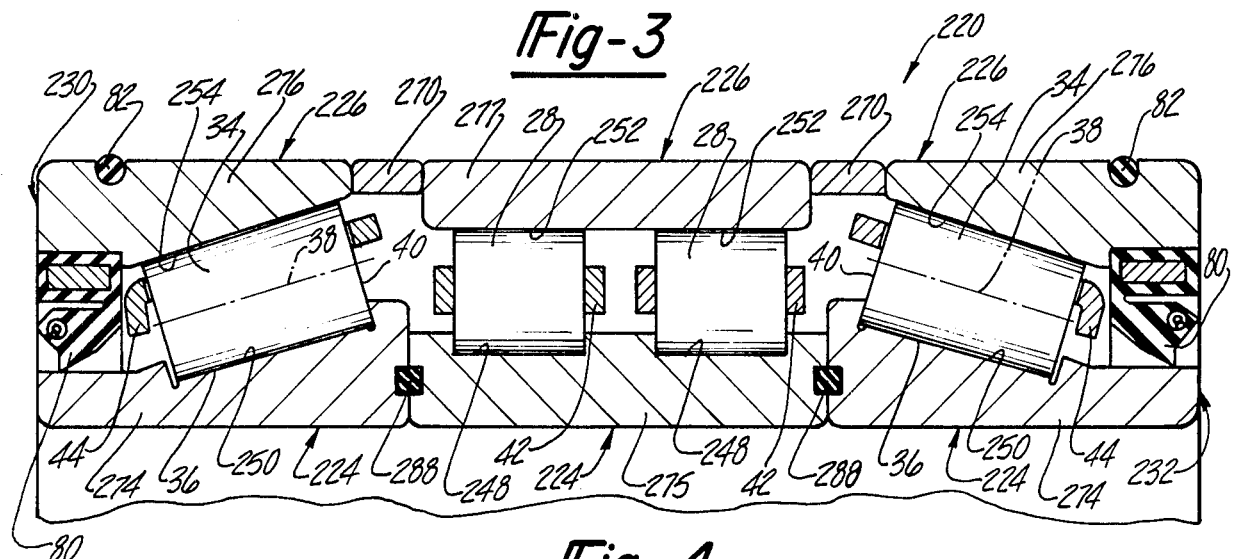
FIG. 4 is a partial longitudinal cross-sectional view similar to FIG. 2, but illustrating another alternate embodiment of the bearing assembly of the present invention.

In FIG. 4, still another alternate embodiment of the present invention is illustrated, wherein an alternate self-contained roller bearing assembly 220 includes a radially inner bearing race member 224 having recessed radially inner cylindrical raceways 248 and recessed radially inner conical raceways 250 at axial locations that correspond to the axial locations of the respective rows of cylindrical roller elements 28 and tapered roller elements 34. Similarly, a radially outer bearing race member 226 includes non-recessed radially outer cylindrical raceways 252 and non-recessed radially outer conical raceways 254 at axial locations corresponding to those of the respective rows of cylindrical roller elements 28 and tapered roller elements 34. Like the non-recessed raceways in the other embodiments discussed above and below, the non-recessed raceways 252 and 254 include raceway surfaces that are generally axially longer than the corresponding dimensions of their respective rollers in order to facilitate the desired adjustments described above.

Although the alternate bearing assembly 220 of FIG. 4 is generally similar, both in structure and function, to the previously discussed embodiments of FIGS. 2 and 3, it differs in having its rows of tapered roller elements 34 disposed generally axially adjacent the axial ends 230 and 232. The tapered roller elements 34 include tapered or conical peripheral surfaces 36 with diameters that increase axially toward one another and radially outwardly, with their larger diameter ends 40 oriented toward one another. As discussed above, the tapered roller elements 34 are rotatable about rotational center lines 38 that converge generally in a radially outward direction. In the embodiment of FIG. 4, the rows of cylindrical roller elements 28 are axially located between the rows of tapered roller elements for rotation about a common center line generally parallel to the axis of rotation of the roll or shaft-like member supported by the bearing assembly 220.

In FIG. 4, the non-recessed radially outer cylindrical raceway 252 is generally continuous along at least a substantial axial part of the radially inner side of the intermediate radially outer race member portion 277. Thus the race member portion 277 is symmetrical and reversible, and similarly the axial spacer members 270 and the radially outer race member portions 276 are also reversible and interchangeable, without affecting the radial or axial clearance or end play of the bearing assembly 220. Such a relationship is obtained largely because the total axial length of the axial spacer members 270 and the radially outer race member portion 277 remains constant, and thus the axial spacing between the pair of radially outer race member portions 276 remains constant, regardless of the reversible orientation or interchangeable axial position of the outer race member portion 277 and the spacer members 270.

In a similar manner, it should also be noted that because the non-recessed cylindrical raceway 252 extends generally continuously along a substantial part of the axial length of the outer race member portion 277, the axial orientation of the radially inner intermediate race member portion 275 and the radially outer intermediate race member portion 277 is not critical. Therefore, the inner race member portion 275 is also reversible, and the inner race member portions 274 are reversible and interchangeable. Furthermore, the cylindrical roller elements 28 are free to axially adjust themselves relative to the non-recessed radially outer raceways 252, and the tapered roller elements 34 are also free to adjust themselves generally axially and radially relative to their non-recessed conical raceways 254. Thus, the radial and axial end play bearing clearances are automatically controlled and maintained at predetermined desired levels so long as the axial spacer members 270 and the intermediate outer race member portion 277 are installed axially between the outer race member portions 276. As with the other embodiments described herein, such an arrangement is possible in the embodiment of FIG. 4 since only one pair of tapered roller elements are included, with the other roller elements being cylindrical, and because the lengths (generally axially) of the non-recessed raceway surfaces are greater than that of their respective rollers. The remaining features of the FIG. 4 embodiment are essentially similar to those described above for FIGS. 1 through 3.

Figure 5:
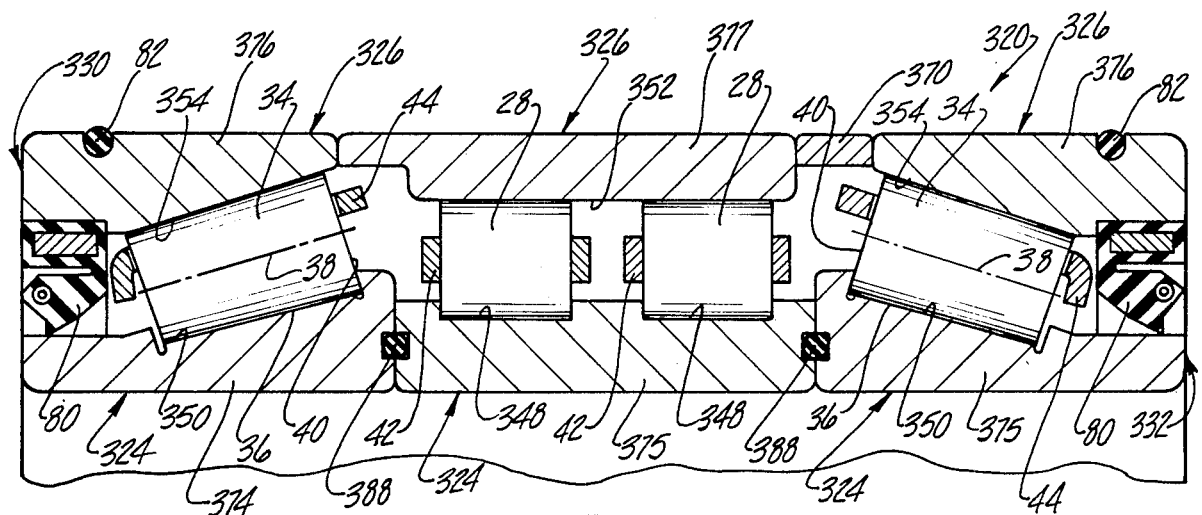
FIG. 5 is a partial longitudinal cross-sectional view similar to FIG. 2, but illustrating still another alternate embodiment of the bearing assembly of the present invention.

In FIG. 5, still another alternate bearing assembly 320 is illustrated and includes a radially outer intermediate race member 377 that is essentially a one-piece equivalent of the outer race member 277 and one of the axial spacer members 270 of FIG. 4. Similar to the corresponding elements of the embodiment of FIG. 4, the outer race member 377 and the separate axial spacer member 370 are axially reversible and interchangeable without affecting the predetermined radial or axial bearing clearances of the bearing assembly 320. Thus, in a still further variation, one skilled in the art will now readily recognize that either or both of the axial spacer members 270 of FIG. 4 can be incorporated into a one-piece member with the radially outer intermediate race member portion 277 in a manner similar to that of the one-piece member 377 shown for example in FIG. 5. The remaining elements, features and functions of such alternate embodiments, of which FIG. 5 is an example, are essentially the same as those corresponding elements, features and functions described above.

FIG. 6 illustrates still another embodiment of the present invention, wherein bearing assembly 420 is generally similar to bearing assemblies 220 or 320, except for the structure of the recessed inner cylindrical raceways 448. The raceways 448 are formed in the radially inner race member portion 475 such that each of the cylindrical roller elements 28 are axially contained on one of their axial ends by an axially interior end 490 on each of the respective inner race member portions 474. Thus the forming of the recessed raceways 448 in the race member portion 475 is more easily accomplished since the recessed raceways extend all the way to the axially exterior ends 492 of the inner race member portion 475. In other respects, the remaining elements and features of the FIG. 6 embodiments are essentially and correspondingly the same as those described above.

FIG. 7 illustrates still another alternate embodiment of the invention, wherein bearing assembly 520 is generally functionally similar to the embodiments of FIGS. 4 through 6, but differs somewhat in its structural configuration. The bearing assembly 520 includes a radially outer race member 526 having a pair of substantially identical outer race member portions 576 that are axially separable along a plane between the cylindrical roller elements 28, and spaced apart by an axial spacer 570. Likewise a radially inner race member portion 524 includes a pair of substantially identical inner race member portions 574 that are also similarly axially separable. The bearing assembly 520 is functionally similar to the other embodiments described above in connection with FIGS. 4 through 6, but no separate intermediate race member portions are necessary. Such components are incorporated into the symmetrical pairs of inner and outer race member portions 574 and 576, respectively. Because the non-recessed outer cylindrical raceway 552 is generally continuous along at least a substantial portion of the adjacent inner sides of the outer race member portions 576, the cylindrical and tapered roller elements 28 and 34, respectively can adjust themselves radially and axially as described above. Furthermore, the outer race member portions 576 are substantially identical and interchangeable and the inner race member portions 574 are also substantially identical and interchangeable. Thus the desired radial and axial clearances are automatically maintained in a manner similar to that discussed above regardless of which end of the bearing assembly 520 a particular race member portion is installed or assembled. In other aspects, including its configuration being generally symmetrical from one axial side or end to another, the bearing assembly 520 is essentially the same as those described above.

Finally, FIG. 8 illustrates still another exemplary alternate embodiment of the various embodiments of the invention, wherein the bearing assembly 620 is generally structural similar to the bearing assembly 420 of FIG. 6, and generally functionally similar to the embodiments of FIGS. 4 through 7, but differs in that the plurality of separate rows of cylindrical rollers 28 are replaced by a single row of cylindrical rollers 628. As shown in FIG. 8, the rollers 628 can be axially longer than each of the rollers 28 if required in order to carry the anticipated loads in any particular application. It should be noted that the row of rollers 628 are shown in FIG. 8 as rotatably engaging a recessed cylindrical raceway 648 on the inner race member portion 675, and a non-recessed raceway 652 on the outer race member portion 677, for purposes of illustration. One skilled in the art will now readily recognize, however, that a recessed cylindrical raceway can alternatively be formed in the outer race member portion 677, with a non-recessed cylindrical raceway on the inner race member portion 675, instead.

The foregoing discussion discloses and describes exemplary embodiments of the present invention. One skilled in the art will readily recognize from such discussion that various changes, modifications and variations may be made therein without departing from the spirit and scope of the invention as defined in the following claims.

We claim:

1. A roller bearing assembly comprising radially inner and outer bearing race members coaxially disposed for rotation relative to one another, at least one circumferential row of cylindrical rollers and a pair of circumferential rows of tapered rollers disposed radially between said radially inner and outer bearing race members, each said row of rollers being rotatably engaged with a respective pair of radially opposed raceway surfaces formed in said bearing race members, said rows of tapered rollers being inclined relative to one another so as to accept thrust loads in opposite directions, said raceway surfaces receiving said tapered rollers being conical raceway surfaces, said outer bearing race member including at least a pair of separate conical race member portions axially separated from one another, each conical race member portion including one said conical raceway surface for receiving a respective one of said rows of tapered rollers, one raceway surface of each of said pair of raceway surfaces being non-recessed so as to provide no restraint to said rollers in engagement therewith, the other of said raceway surfaces of each of said pair of raceway surfaces being recessed so as to axially restrain said rollers in engagement therewith, said conical race member portions being interchangeable with one another, said radially outer bearing race member further including a separate cylindrical outer bearing race member portion for said cylindrical rollers, said cylindrical outer race member portion and said cylindrical rollers being axially interposed between said conical race member portions having said conical raceway surfaces, said radially inner and outer bearing members having a predetermined, fixed radial bearing clearance between said at least one row of cylindrical rollers, the radial bearing clearance between said pair of rows of tapered rollers being determined solely by the distance said conical race member portions are axially separated from one another, an uninterrupted, circumferential, ring shaped, axial spacer member having a predetermined fixed axial length disposed between and abutting against the axially inward end of at least one of said conical race member portions such that the axial length of said spacer member determines the radial bearing clearance between said pair of rows of tapered rollers, whereby said conical race member portions may be interchanged with one another and/or said axial spacer member may be reversed, all without altering the radial bearing clearance between any of said rows of rollers.

2. The roller bearing assembly of claim 1, wherein said radially inner bearing race member includes separate inner bearing race member portions for each of said rows of tapered rollers, the axially inward ends of said inner bearing race member portions being in abutting engagement with the remainder of said radially inner bearing race member and having a groove, and a sealing member located within each said groove whereby the juncture between said inner bearing race member portions with the remainder of said radially inner bearing race member is fully sealed.

3. The roller bearing assembly of claim 2 wherein said radially inner bearing race member includes a separate cylindrical inner bearing race member portion for said cylindrical rollers, said cylindrical inner bearing race member portion and said cylindrical rollers being axially interposed between said inner bearing race member portions carrying said tapered rollers.

4. The roller bearing assembly of claim 3, wherein said at least one circumferential row of cylindrical rollers is a single row.

5. The roller bearing assembly of claim 4, wherein said axial spacer member is interposed between one of said conical race member portions of said radially outer bearing race member and said cylindrical outer bearing race member portion, and a second uninterrupted, circumferential ring shaped axial spacer member being interposed between the remaining said conical race member portion and said cylindrical outer bearing race member portion.

6. The roller bearing assembly of claim 5, wherein said radially outer bearing race member includes an outer sealing member at each axial outer end of the outer diametric surface thereof,
   an end sealing member being located at each axial end of said bearing assembly and between the respective said radially inner and outer bearing race members,
   said outer sealing members and said end sealing members thereby providing a fully sealed roller bearing assembly adapted to be sealingly bound within a chock assembly of a rolling mill.

7. The roller bearing assembly of claim 6, wherein said inner bearing race includes a constant inner diameter whereby said roller bearing assembly is adapted to be slipped onto and support a roll-neck portion of a rolling mill,
   said outer bearing race member having a constant outer diameter substantially equal to the outer diameter of said axial spacer member whereby said roller bearing assembly may be slideably received within and supported by the chock assembly of a rolling mill, and
   each said outer sealing member comprising an O-ring partially disposed within and retained by a respective groove in the outer diametric surface of said outer bearing race member.

8. The roller bearing assembly of claim 3, wherein said at least one row of cylindrical rollers includes two rows of cylindrical rollers.

9. The roller bearing assembly of claim 3, wherein said at least one row of cylindrical rollers includes two rows of cylindrical rollers,
   said axial spacer member being interposed between one of said conical race member portions of said radially outer bearing race member and said cylindrical outer bearing race member portion, and a second uninterrupted, circumferential ring shaped axial spacer member being interposed between the remaining said conical race member portion and said cylindrical outer bearing race member portion,
   said radially outer bearing race member including an outer sealing member at each axial outer end of the outer diametric surface thereof,
   an end sealing member being located at each axial end of said bearing assembly and between the respective said radially inner and outer bearing race members,
   said outer sealing members and said end sealing members thereby providing a fully sealed roller bearing assembly adapted to be sealingly bound within a chock assembly of a rolling mill.

10. The roller bearing assembly of claim 1, wherein said radially outer bearing race member includes an outer sealing member at each axial outer end thereof,
    an end sealing member being located at each axial end of said bearing assembly and between the respective said radially inner and outer bearing race members,
    said outer sealing members and said end sealing members thereby providing a fully sealed roller bearing assembly adapted to be sealingly bound within a chock assembly of a rolling mill.

11. The roller bearing assembly of claim 1, wherein said inner bearing race member includes a constant inner diameter whereby said roller bearing assembly is adapted to be slipped onto and support a roll-neck portion of a rolling mill,
    said outer bearing race member having a constant outer diameter substantially equal to the outer diameter of said axial spacer member whereby said roller bearing assembly may be slideably received within and supported by the chock assembly of a rolling mill,
    said radially outer bearing race member including an outer sealing member at each axial outer end of the outer diametric surface thereof,
    an end sealing member being located at each axial end of said bearing assembly and between the respective said radially inner and outer bearing race members,
    said outer sealing members and said end sealing members thereby providing a fully sealed roller bearing assembly adapted to be sealingly bound within a chock assembly of a rolling mill.

12. A roller bearing assembly comprising radially inner and outer bearing race members coaxially disposed for rotation relative to one another, a pair of circumferential rows of cylindrical rollers and a pair of circumferential rows of tapered rollers disposed radially between said radially inner and outer bearing race members, each said row of rollers being rotatably engaged with a respective pair of radially opposed raceway surfaces formed in said bearing race members,
    each said row of cylindrical rollers being carried by a respective outer bearing race member portion at the axially outward ends thereof, and each said row of tapered rollers being carried at the axially inward ends of said outer bearing race member portions,
    said rows of tapered rollers being inclined relative to one another so as to accept thrust loads in opposite directions, said raceway surfaces receiving said tapered rollers being conical raceway surfaces,
    said outer bearing race member including at least a pair of separate race member portions axially separated from one another, each race member portion including one said conical raceway surface for receiving a respective one of said rows of tapered rollers,
    one raceway surface of each of said pair of raceway surfaces being non-recessed so as to provide no restraint to said rollers in engagement therewith, the other of said raceway surfaces of each of said pair of raceway surfaces being recessed so as to axially restrain said rollers in engagement therewith,
    said race member portions being interchangeable with one another,
    said radially inner and outer bearing members having a predetermined, fixed radial bearing clearance between each row of cylindrical rollers,
    the radial bearing clearance between said pair of rows of tapered rollers being determined solely by the distance said race member portions are axially separated from one another,
    an uninterrupted, circumferential, ring shaped, axial spacer member having a predetermined fixed axial length disposed between and abutting against the axially inward end of at least one of said race member portions such that the axial length of said spacer member determines the radial bearing clearance between said pair of rows of tapered rollers, whereby said race member portions may be interchanged with one another and/or said axial spacer member may be reversed, all without altering the radial bearing clearance between any of said rows of rollers, said inner bearing race member including a constant inner diameter whereby said roller bearing assembly is adapted to be slipped onto and support a roll-neck portion of a rolling mill, said outer bearing race member having a constant outer diameter substantially equal to the outer diameter of said axial spacer member whereby said roller bearing assembly may be slideably received within and supported by the chock assembly of a rolling mill, said radially outer bearing race member including an outer sealing member at each axial outer end thereof, an end sealing member being located at each axial end of said bearing assembly and between the respective said radially inner and outer bearing race members, said outer sealing members and said end sealing members thereby providing a fully sealed roller bearing assembly adapted to be sealingly bound within a chock assembly of a rolling mill.

13. The apparatus of claim 12, wherein said radially inner bearing race member includes a separate inner bearing race member portion for each of said rows of tapered rollers, the axially inward ends of said inner bearing race member portions being in abutting engagement with the remainder of said radially inner bearing race member and having a groove, and a sealing member located within each said groove whereby the juncture between said inner bearing race member portions with the remainder of said radially inner bearing race member is fully sealed.

* * * * *